United States Patent
Patel et al.

(10) Patent No.: US 9,108,163 B2
(45) Date of Patent: Aug. 18, 2015

(54) MICROPOROUS MEMBRANE FOR FLASH DISTILLATION

(75) Inventors: Kirit Patel, Bridgewater, NJ (US); Donald H. White, Savage, MN (US); Andrew Dahlgren, Chanhassen, MN (US); Richard Brandimarte, Bensalem, PA (US)

(73) Assignee: Donaldson Company, Inc., Minneapolis, MN (US)

( * ) Notice: Subject to any disclaimer, the term of this patent is extended or adjusted under 35 U.S.C. 154(b) by 917 days.

(21) Appl. No.: 11/997,505

(22) PCT Filed: Aug. 3, 2006

(86) PCT No.: PCT/US2006/030516
§ 371 (c)(1),
(2), (4) Date: Jun. 25, 2008

(87) PCT Pub. No.: WO2007/019350
PCT Pub. Date: Feb. 15, 2007

(65) Prior Publication Data
US 2008/0314727 A1    Dec. 25, 2008

Related U.S. Application Data

(60) Provisional application No. 60/705,275, filed on Aug. 3, 2005.

(51) Int. Cl.
*B01D 61/36*  (2006.01)
*B01D 71/36*  (2006.01)
*B01D 3/14*   (2006.01)
(Continued)

(52) U.S. Cl.
CPC .............. *B01D 61/364* (2013.01); *B01D 3/146* (2013.01); *B01D 63/061* (2013.01); *B01D 69/02* (2013.01); *B01D 69/12* (2013.01); *B01D 69/141* (2013.01); *B01D 71/32* (2013.01); *C02F 1/04* (2013.01); *B01D 2325/02* (2013.01); *C02F 1/06* (2013.01); *C02F 2103/08* (2013.01)

(58) Field of Classification Search
None
See application file for complete search history.

(56) References Cited

U.S. PATENT DOCUMENTS 4,316,772 A    2/1982  Cheng et al.
4,324,574 A *  4/1982  Fagan .............................. 55/487

(Continued)

FOREIGN PATENT DOCUMENTS

EP    0391660    10/1990
GB    2151155    7/1985

(Continued)

OTHER PUBLICATIONS

Notice on the First Office Action from The State Intellectual Property Office of the People's Republic of China, mailed Oct. 28, 2010, in corresponding Chinese Application No. 200680032605.2; 9 pages.

(Continued)

*Primary Examiner* — Krishnan S Menon
(74) *Attorney, Agent, or Firm* — Pauly, DeVries Smith & Deffner LLC

(57) ABSTRACT

A microporous membrane for flash distillation comprising at least three layers having distinct properties is disclosed. Generally, the membranes contain outer layers of relatively small pore size, with an interior layer with relatively large pore size. The invention is also directed to a system for desalinization comprising a source of hot brine.

4 Claims, 4 Drawing Sheets

(51) Int. Cl.

| | | |
|---|---|---|
| *B01D 63/06* | (2006.01) | |
| *B01D 69/02* | (2006.01) | |
| *B01D 69/12* | (2006.01) | |
| *B01D 69/14* | (2006.01) | |
| *B01D 71/32* | (2006.01) | |
| *C02F 1/04* | (2006.01) | |
| *C02F 1/06* | (2006.01) | |
| *C02F 103/08* | (2006.01) | |

(56) References Cited

U.S. PATENT DOCUMENTS

| | | | | |
|---|---|---|---|---|
| 4,346,006 A | * | 8/1982 | Kopp et al. | 210/321.62 |
| 4,385,093 A | | 5/1983 | Hubis | |
| 4,476,024 A | | 10/1984 | Cheng | |
| 4,545,862 A | | 10/1985 | Gore et al. | |
| 4,728,397 A | | 3/1988 | Kjellander et al. | |
| 4,780,211 A | | 10/1988 | Lien | |
| 4,816,328 A | * | 3/1989 | Saville et al. | 442/289 |
| 4,933,082 A | * | 6/1990 | Yamada et al. | 96/12 |
| 4,983,434 A | * | 1/1991 | Sassa | 428/36.2 |
| 5,064,593 A | | 11/1991 | Tamaru et al. | |
| 5,094,895 A | * | 3/1992 | Branca et al. | 428/36.91 |
| 5,102,550 A | | 4/1992 | Pizzino et al. | |
| 5,522,970 A | | 6/1996 | Shimizu et al. | |
| 6,030,428 A | * | 2/2000 | Ishino et al. | 55/486 |
| 6,149,702 A | * | 11/2000 | Kawano et al. | 55/497 |
| 6,165,519 A | * | 12/2000 | Lehrer et al. | 426/77 |
| 6,214,093 B1 | * | 4/2001 | Nabata et al. | 96/11 |
| 6,682,576 B1 | * | 1/2004 | Kiyotani et al. | 55/486 |
| 6,716,355 B1 | | 4/2004 | Hanemaaijer et al. | |
| 6,808,553 B2 | * | 10/2004 | Kawano et al. | 95/287 |
| 2004/0200771 A1 | * | 10/2004 | Proulx et al. | 210/500.21 |

FOREIGN PATENT DOCUMENTS

| | | |
|---|---|---|
| JP | 64-034408 | 2/1989 |
| JP | 04-031443 | 2/1992 |
| JP | 2000291988 | 10/2000 |

OTHER PUBLICATIONS

Cath, Tzahi Y. et al., "Experimental study of desalination using direct contact membrane distillation: a new approach to flux enhancement", *Journal of Membrane Science*, 228 2004, 5-16.

Vigo, Fernando et al., "Preparation of asymmetric PTFE membranes and their application in water purification by hyperfiltration", *Journal of Applied Polymer Science*, vol. 21, Issue 12, pp. 3269-3290 1977, 1—Abstract only.

PCT International Search Report, Aug. 4, 2008, 6 pgs.

Third Office Action received for Chinese Application No. 200680032605.2, corresponding to U.S. Appl. No. 11/997,505, mailed Apr. 16, 2012, pp. 1-3.

First Examiner Report received for Australian Application No. 2006278421, corresponding to U.S. Appl. No. 11/997,505, mailed Jun. 22, 2011, pp. 1-2.

Second Office Action received for Chinese Application No. 200680032605.2, corresponding to U.S. Appl. No. 11/997,505, mailed May 24, 2011, pp. 1-7.

Communication Pursuant to Article 94(3) EPC, received for European Application No. 06789437.8, corresponding to U.S. Appl. No. 11/997,505, mailed Jun. 5, 2009, pp. 1-5.

Response to European Examination Report, *Communication pursuant to Article 94 (3) EPC*, dated Jun. 5, 2009, filed in the European Patent Office on Dec. 15, 2009 for EP Patent Application No. 06789437.8, corresponding to U.S. Appl. No. 11/997,505, pp. 1-3.

Fourth Office Action for Chinese Application No. 200680032605.2, mailed Apr. 25, 2013 (4 pages).

Certificate of Grant of a Patent, Chinese Patent No. ZL200680032605.2, Grant Date: Apr. 16, 2014 (4 pages).

Non-Final Office Action for Mexican Patent Application No. MX/a/2008/001671, mailed Dec. 12, 2013 (2 pages).

Official Action for Application Serial No. MX/a/2008/001671, mailed Apr. 2, 2013 (1 page).

Non-Final Office Action for Mexican Patent Application No. MX/a/2008/001671, received Aug. 27, 2014 (4 pages).

First Examination Report for India Patent Application No. 1156/DELNP/2008, mailed Oct. 9, 2014 (2 pages).

"Response to First Examination Report," for India Patent Application No. 1156/DELNP/2008 (our file 758.1953INWO), filed May 29, 2015 (12 pages).

* cited by examiner

MICROPOROUS MEMBRANE FOR FLASH DISTILLATION

PRIORITY

This application claims the benefit of U.S. Provisional Patent Application Ser. No. 60/705,275, entitled "Microporous Membrane for Flash Distillation," filed Aug. 3, 2005.

FIELD OF THE INVENTION

The present invention is directed to microporous membranes for use in distillation of saline water, and methods for using said membranes.

BACKGROUND OF THE INVENTION

The availability of potable water is one of the most significant health and environmental issues facing much of the earth's population. Increasing urbanization, along with degradation and depletion in freshwater supplies, have created a growing need for desalination plants to convert seawater into potable freshwater. One established method of desalination is the use of reverse osmosis membranes to produce potable water for human consumption. Reverse osmosis (RO) has seen significant growth in recent years, but many existing RO systems demonstrate low separation quality, which limits the scope of their application and economy of use, and also require significant energy to operate because the impure water must be pumped at relatively high pressures through the RO membranes.

Multistage flash (MSF) distillation, especially in areas with significant energy resources, is another existing desalination technology. In addition, multi-effect distillation (MED) or vapor compression systems (VC) have attracted some interest. Both MSF and MED can use membranes to help in desalination and wastewater treatment. Although MSF and MED systems have shown increasing acceptance, existing membranes used in these methods have certain deficiencies, including low rejection of salt ions, low flow rates of freshwater or steam through the membranes, lack of durability, or undesirable cost. Therefore, a need exists for an improved membrane for use in MSF and MED systems.

SUMMARY OF THE INVENTION

The present invention is directed, generally, to a microporous membrane for flash distillation comprising at least three layers having distinct properties. Generally, the membranes contain outer layers of relatively small pore size, with an interior layer with relatively large pore size.

Thus, for example, the membrane material can include a first porous membrane layer or region; a second porous membrane layer adjacent the first porous membrane region and having lower density than the first porous membrane layer; and a third porous membrane layer adjacent the second porous membrane region and having a higher density than the second porous membrane region.

The invention is also directed to a system for desalinization comprising a source of hot brine. The system includes, in certain embodiments, a first microporous membrane region wherein the hot brine flashes to steam and a second microporous membrane support region having lower density than the first membrane region, wherein steam from the first membrane region expands. A third microporous membrane region has higher density than the second membrane support region. Expanded steam from the second membrane support region flows through the third membrane region, while the resistance to flow within the third membrane region causes backpressure within the second membrane support region. This backpressure is believed to help prevent the passage of brine from the first membrane region through the second membrane support region. A condenser collects steam from the third membrane region as potable water.

Other features and advantages of the invention will be apparent from the following detailed description of the invention and the claims. The above summary of principles of the disclosure is not intended to describe each illustrated embodiment or every implementation of the present disclosure. The detailed description that follows more particularly exemplifies certain embodiments utilizing the principles disclosed herein.

BRIEF DESCRIPTION OF THE DRAWINGS

The invention will be more fully explained with reference to the following drawings.

Figure 1:
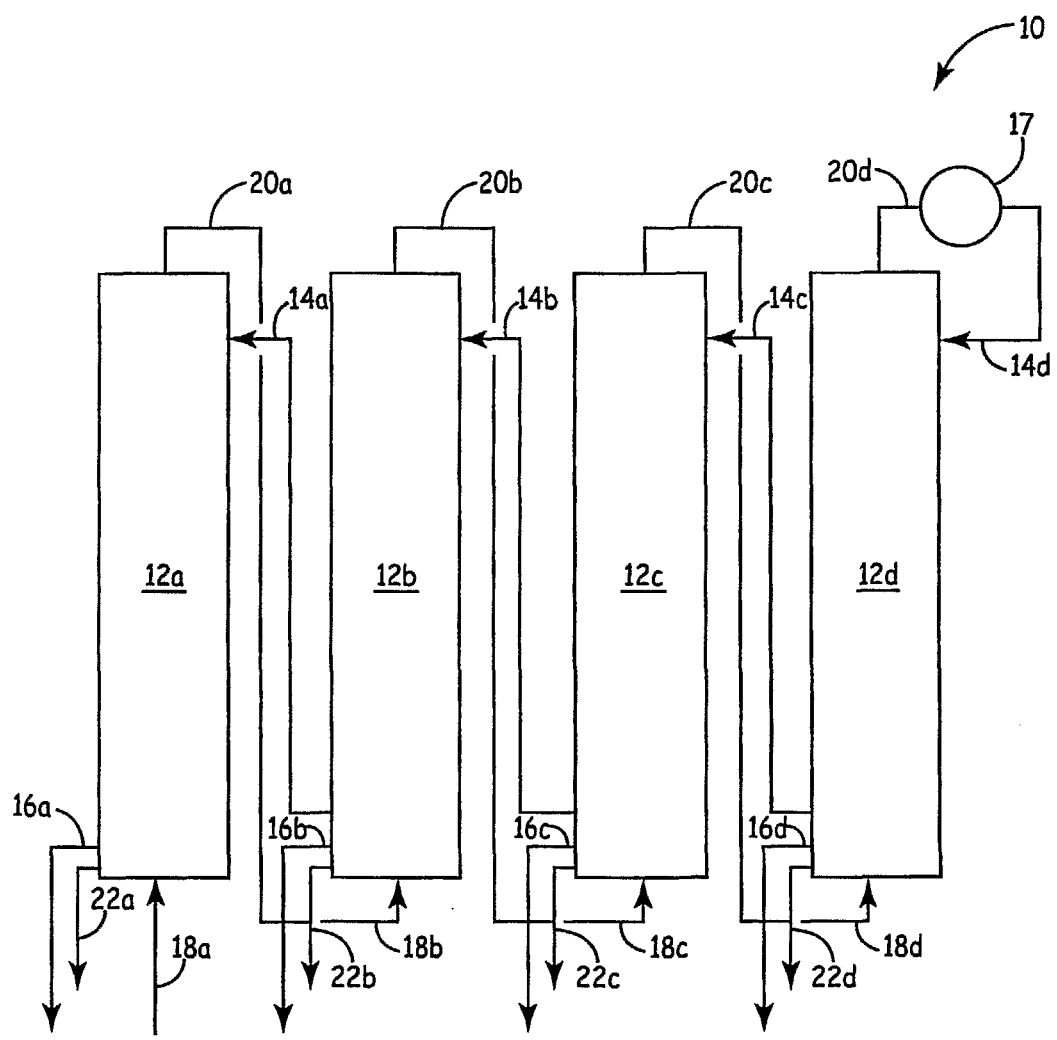
FIG. 1 is a schematic diagram of a four-section continuous membrane flash distillation apparatus made in accordance with aspects of the invention.

While principles of the invention are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure and claims.

DETAILED DESCRIPTION OF THE INVENTION

The present invention is directed, in part, to a microporous membrane for flash distillation comprising at least three regions of membrane material. This membrane material generally includes a first porous membrane region; a second porous membrane region adjacent to the first porous membrane region and having lower density than the first porous membrane region; and a third porous membrane region adjacent the second porous membrane region and having a higher density than the second porous membrane region.

Referring now to the drawings, FIG. 1 shows a schematic diagram of a four section continuous membrane flash distillation apparatus made in accordance with aspects of the invention. In particular, FIG. 1 shows a continuous membrane flash distillation apparatus 10 suitable for use with the multilayer microporous membranes of the invention.

The apparatus 10 of FIG. 1 includes four distillation chambers 12a, 12b, 12c, and 12d connected in series. Each distillation chamber 12a to 12d includes a corresponding input 14a to 14d for heated seawater (including other salt-containing water not originating as seawater, such as salt-containing water from landlocked lakes), plus brine outlets 16a to 16d. Seawater is heated by heater unit 17 in the disclosed embodiment. In addition, each distillation chamber 12a to 12d includes a source seawater inlet feed 18a to 18d and outlet 20a to 20d. It will be observed that flow of the heated seawater is in the opposite direction through the distillation chambers than the source seawater that enters by inlet feed. Thus, the heated seawater flows from distillation chamber 12d to 12c to 12b and finally to 12a. Source seawater flows in the opposite direction from chamber 12a to 12b to 12c to 12d. During operation, in the depicted embodiment, the heated seawater from the inputs 14d, 14c, 14b, and 14a function as a countercurrent heat source for warming the source seawater that enters from seawater inlet feed 18a into chamber 12a and then on through subsequent distillation chambers 12b, 12c, and 12d. Distillate is collected out the bottom of each chamber by way of respective distillate outlets 22a, 22b, 22c, and 22d.

Figure 2:
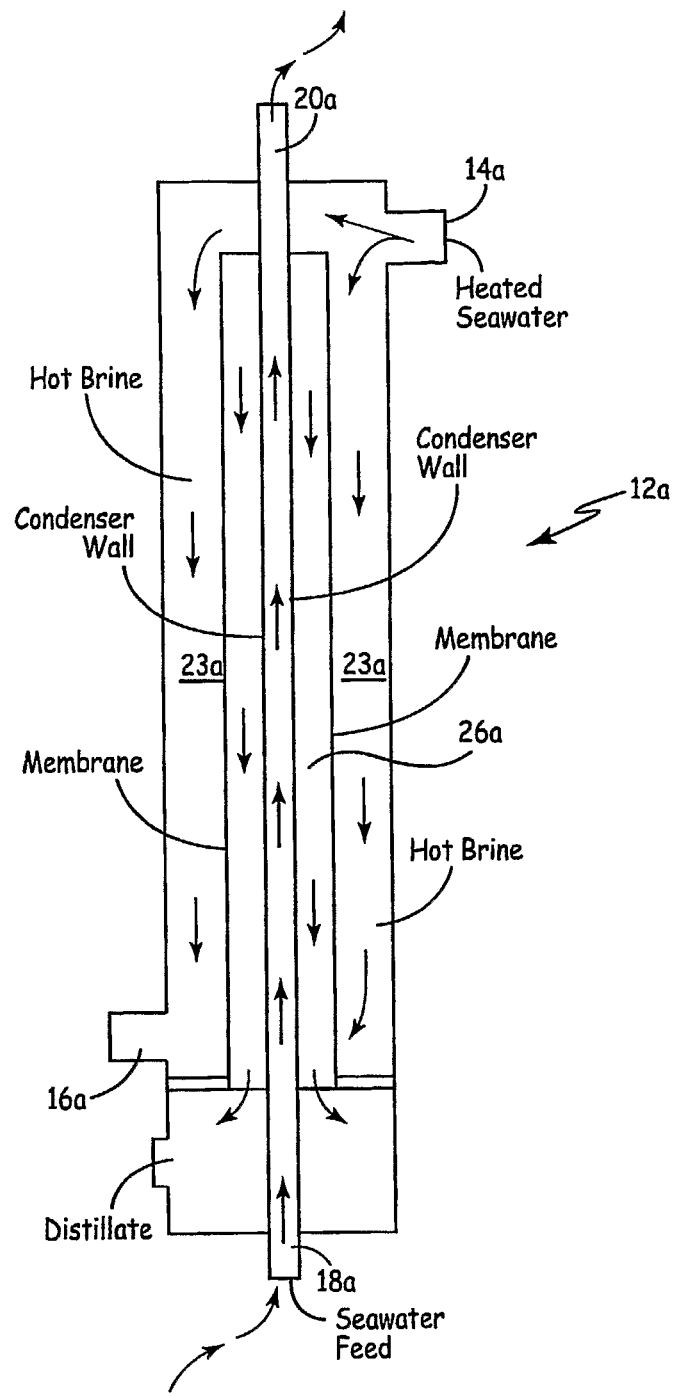
FIG. 2 is a cross sectional drawing of a flash distillation chamber made in accordance with an embodiment of the invention.
Figure 3:
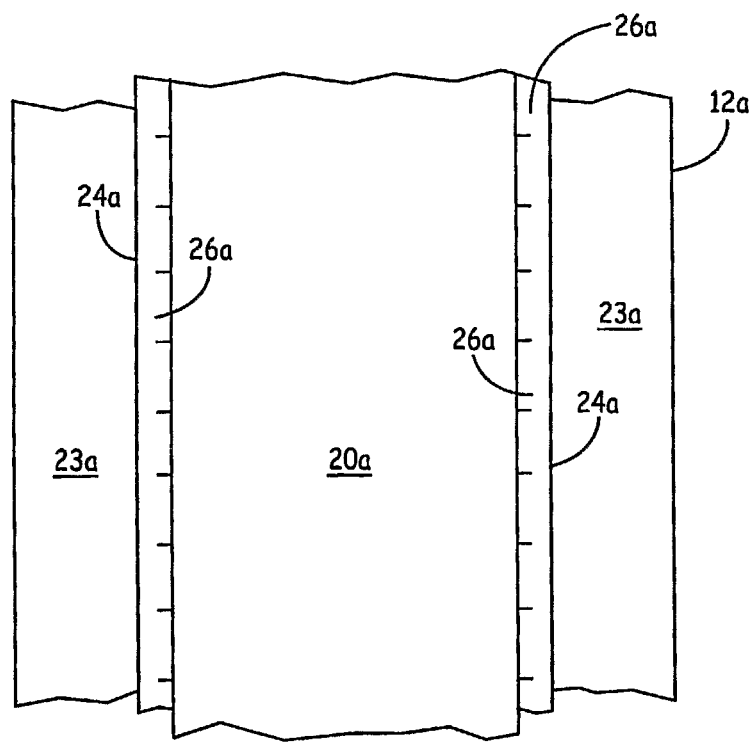
FIG. 3 is a partial cross sectional drawing of the flash distillation chamber of FIG. 2, showing the condenser wall, separation/drainage medium, and vapor membrane.
Figures 4A, 4B:
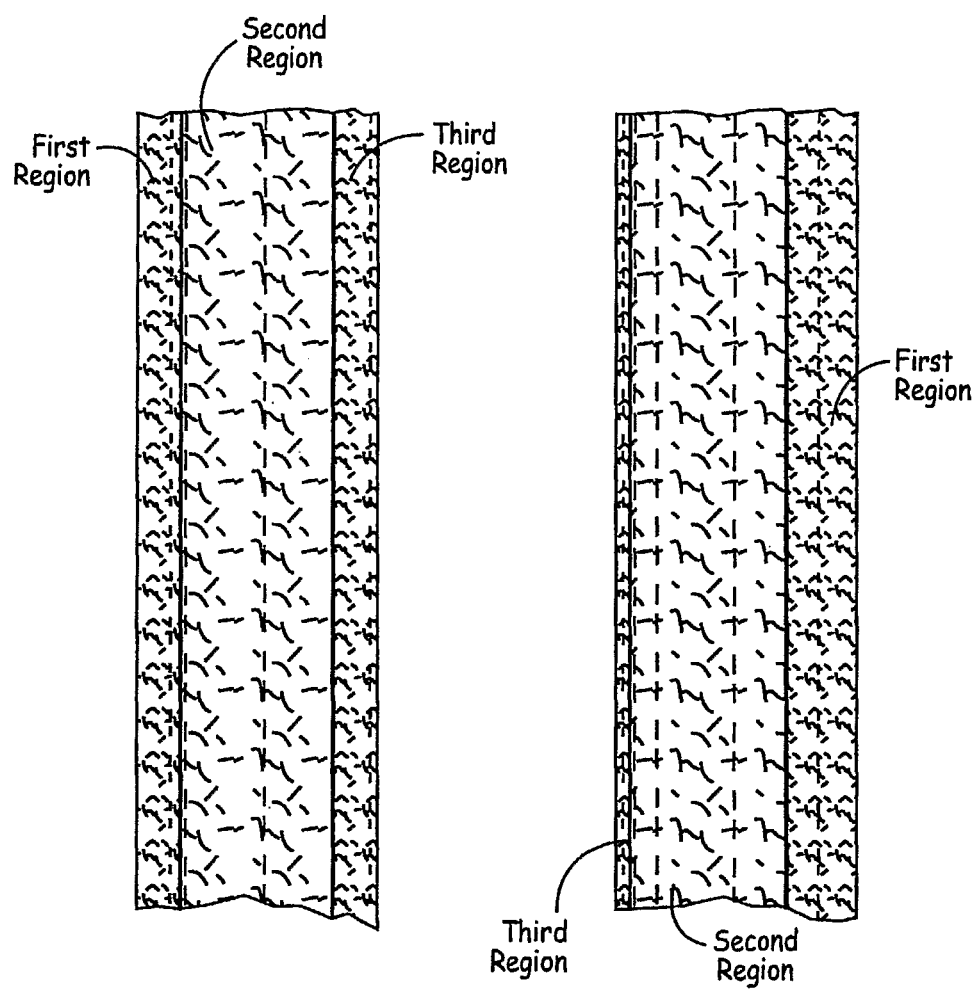
FIG. 4A is an enlarged cross sectional drawing of a vapor membrane made in accordance with an implementation of the invention.
FIG. 4B is an enlarged cross sectional drawing of a vapor membrane made in accordance with an implementation of the invention.

Referring now to FIGS. 2 and 3, operation of the desalination apparatus 10 is explained. The interior of chamber 12a is shown in cross section in FIG. 2, with a detail of a section of that chamber shown in FIG. 3. Heated seawater enters chamber 12a at input 14a, travels along the length of chamber 12a via heated seawater passage 23a to outlet 16a. The heated seawater in passage 23a comes in contact with membrane 24a, and some of the heated seawater is formed into steam at the membrane, and enters collection chamber 26a.

In certain embodiments, the membrane 24a includes a first microporous membrane region wherein the hot brine flashes to steam and a second microporous membrane support region having lower density than the first membrane region, wherein steam from the first membrane region expands. A third microporous membrane region has higher density than the second membrane support region. Expanded steam from the second membrane support region flows through the third membrane region, while the resistance to flow within the third membrane region causes backpressure within the second membrane support region. This backpressure is believed to help prevent the passage of brine from the first membrane region through the second membrane support region. A condenser collects steam from the third membrane region as potable water The microporous membrane can include, for example, a polymeric film characterized by nodes interconnected by fibrils. In certain embodiments the first region and the third region are characterized by an average pore size of 0.02 to 1.0 microns. Also, in certain embodiments the first region and the third region are characterized by an average void fraction of 70 to 97 percent. The second region can have, for example an average void fraction of 80 to 97 percent.

Generally, the thickness of each region is about 0.001 to 0.004 inch, but can be thicker or thinner in some embodiments. In some embodiments the overall microporous membrane is 0.001 to 0.01 inch thick, in other embodiments the overall thickness of the microporous membrane is 0.004 to 0.01 inches.

In some embodiments each region comprises a material selected from the group consisting of metal fibers, borosilicate fiberglass, a polymer, and combinations thereof. For example, one or more region can be formed expanded polymeric material selected from the group consisting of polyester, polypropylene, polycarbonate, polyfluorocarbons, and combinations thereof. Particularly suitable as a membrane material is polytetrafluoroethylene (PTFE). In some embodiments it is possible to add a hydrophilic treatment to the membranes.

The membrane can be provided in a tubular shape. This tubular shape can be formed by, for example, centrifugal casting or spiral wrapping. A tubular shape can be obtained by paste extrusion, stretching, and sintering; or formed by rolling a stretched membrane onto a mandrill followed by sintering. In some embodiments the membrane is heat stabilized by applying heat to the membrane under pressure.

The invention is also directed to system for desalinization comprising a source of hot brine; a first microporous membrane region wherein the hot brine flashes to steam; a second microporous membrane support region having lower density than the first membrane region, wherein steam from the first membrane region expands; and a third microporous membrane region having higher density than the second membrane support region, wherein the expanded steam from the second membrane support region flows through the third membrane region and wherein the resistance to flow within the third membrane region causes backpressure within the second membrane support region that prevents the passage of brine from the first membrane region through the second membrane support region.

In some embodiments of this system, first microporous membrane region and the third microporous membrane region comprise pore sizes of 0.02 to 1.0 microns, and the second microporous membrane support region comprises a void fraction of 80 to 97 percent.

In certain applications, a microporous membrane is comprises at least two layers, wherein each layer is characterized by nodes interconnected by fibrils, the layers are bonded by means of plastic flow at temperatures below the melting point of either membrane material, and the pore architecture is formed in situ by an expansion process. A stratified microporous membrane is produced wherein the pore architecture of each layer may be discretely controlled.

The pore architecture of PTFE or PTFE/silicone membranes can be discretely controlled in a layered fashion by permanently bonding two or more extrudate ribbons together during a calendering process. By utilizing different extrudate compositions, the degree of molecular orientation caused by extrusion and calendering can be dissimilar for each layer. Since at least one layer of the extrudate ribbon is still partially saturated with organic lubricant at the time of laminating, cold mass flow is easily accomplished and a permanent bond is readily achieved.

Any subsequent expansion of the stratified extrudate ribbon produces pore structures of disparate or different architectures in each layer. As a result, the final product is actually a single membrane with a stratified pore structure rather than a lamination of separate membranes. The effect can be further exaggerated by applying different amounts of linear and/or transverse stretching to one or more of the extrudate ribbons prior to calendar bonding. The thickness of each layer is determined by the thickness to which it is calendered prior to lamination, and may be different for each layer of the product.

It is further contemplated that each layer of the stratified ribbon may be independently modified with surfactants and the like prior to lamination to produce a microporous sheeting with different surface properties on each side thereof.

Furthermore, multi-layered articles may be produced by repeating the process in series. Alternatively, multiple layers of the same polymer formulation may be laminated together to permit the expansion of extrudate ribbon of a thickness greater than that which can be achieved with a given extrusion die.

The product of this process is useful for numerous applications. For example, stratified pore architectures have obvious usefulness in filtration processes. A very thin film with a small pore size may be attached to a thicker membrane with a larger pore size. The effect is to have most of the filter efficiency of the thin, small pore size membrane; while having the overall physical integrity of the thicker membrane. Since an adhesive is not used in this process, the flow rate and efficiency of the filtration system is not decreased by the blockage of open pores. Since the expansion process creates pore size gradients in situ, the crushing effect of thermo bonding two microporous membranes is avoided.

The invention relates more particularly to a microporous layered membrane with a stratified pore structure across its thickness. One layer of the membrane has a mean pore size which is substantially smaller or larger than the mean pore size in the other layer(s). This stratified pore structure is created in situ by the process of 1) extruding polytetrafluoroethylene (PTFE) resin or a PTFE silicone interpenetrating polymer network (IPN) into a first ribbon; 2) optionally, calendaring said first ribbon to a reduced thickness; 3) optionally, orienting said calendared first ribbon by causing stretching in at least one direction; 4) extruding a second PTFE or IPN ribbon of like or dissimilar composition; 5) optionally, calendaring said second ribbon to a reduced thickness; 6) laminating the first sheeting material to the second extrudate ribbon during an addition calendaring process; 7) orienting the ribbon of step (6) by stretching in at least one direction so as to create a microporous membrane with a stratified pore structure; and 8) optionally, heating the membrane above its crystalline melting point as to cause sintering. The bond between layers of ribbon is achieved under conditions of high plasticity, and the porosity of each layer is determined by the expansion process.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A system for desalinization comprising:
   a supply of hot brine;
   three microporous membrane regions comprising polytetrafluoroethylene, the three membrane regions comprising:
   a first microporous membrane region wherein the hot brine flashes to steam;
   a second microporous membrane support region having lower density than the first membrane region, wherein steam from the first membrane region expands; and
   a third microporous membrane region having higher density than the second membrane support region wherein the expanded steam from the second membrane support region flows through the third membrane region and wherein the resistance to flow within the third membrane region causes backpressure within the second membrane support region that prevents the passage of brine from the first membrane region through the second membrane support region;
   and a condenser that collects steam from the third membrane region as pure water.

2. The system for desalinization of claim 1, wherein the first microporous membrane region and the third microporous membrane region comprise pore sizes of 0.02 to 1.0 microns.

3. The system for desalinization of claim 1, wherein the second microporous membrane support region comprises a void fraction of 80 to 97 percent.

4. The system for desalinization of claim 1, wherein each microporous membrane region is characterized by nodes interconnected by fibrils.

* * * * *